(12) United States Patent
Ting et al.

(10) Patent No.: US 10,826,192 B2
(45) Date of Patent: Nov. 3, 2020

(54) ANTENNA AND METHOD OF MANUFACTURING THE SAME, DISPLAY PANEL

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Tienlun Ting, Beijing (CN); Xiangzhong Kong, Beijing (CN); Lei Wang, Beijing (CN); Ken Wen, Beijing (CN); Guangkui Qin, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 3 days.

(21) Appl. No.: 16/422,321

(22) Filed: May 24, 2019

(65) Prior Publication Data
US 2019/0363452 A1    Nov. 28, 2019

(30) Foreign Application Priority Data
May 28, 2018   (CN) .......................... 2018 1 0525570

(51) Int. Cl.
*H01Q 21/00*       (2006.01)
*G02F 1/13*         (2006.01)
(Continued)

(52) U.S. Cl.
CPC ....... *H01Q 21/0075* (2013.01); *G02F 1/1313* (2013.01); *G02F 1/13439* (2013.01);
(Continued)

(58) Field of Classification Search
CPC ............. H01Q 21/0075; H01Q 1/2283; H01Q 9/0407; H01Q 21/065; H01Q 5/335;
(Continued)

(56) References Cited

U.S. PATENT DOCUMENTS 10,312,588 B2 * 6/2019 Zhang ...................... H01Q 3/44
2014/0266897 A1   9/2014 Jakoby et al.
(Continued)

FOREIGN PATENT DOCUMENTS

CN         101464585 A       6/2009
CN         102842755 A      12/2012
(Continued)

OTHER PUBLICATIONS

First Office Action issued in corresponding Chinese Patent Application No. 201810525570.0, dated Oct. 29, 2019, with English translation.

*Primary Examiner* — Daniel D Chang
(74) *Attorney, Agent, or Firm* — McDermott Will & Emery LLP (57) ABSTRACT

An antenna includes: a first substrate and a second substrate; a first antenna electrode is disposed on a side of the first substrate away from the second substrate; a second antenna electrode is disposed on a side of the second substrate away from the first substrate and a microstrip line is disposed on a side of the second substrate close to the first substrate; a liquid crystal layer is disposed between the first substrate and the second substrate; at least one drive electrode assembly is disposed between the first substrate and the second substrate. The at least one drive electrode assembly is configured to achieve impedance matching of the antenna by controlling liquid crystal molecules of the liquid crystal layer to deflect.

17 Claims, 7 Drawing Sheets

(51) Int. Cl.
  *G02F 1/1343* (2006.01)
  *H01Q 1/22* (2006.01)
  *H01Q 9/04* (2006.01)
  *H01Q 21/06* (2006.01)

(52) U.S. Cl.
  CPC ......... *H01Q 1/2283* (2013.01); *H01Q 9/0407* (2013.01); *H01Q 21/065* (2013.01)

(58) Field of Classification Search
  CPC ... H01Q 1/44; H01Q 1/38; H01Q 1/50; G02F 1/1313; G02F 1/13439; G02F 1/1343
  See application file for complete search history.

(56) References Cited

U.S. PATENT DOCUMENTS

| | | |
|---|---|---|
| 2015/0380789 A1* | 12/2015 | Jakoby .................. H01P 1/184 343/905 |
| 2019/0103671 A1 | 4/2019 | Dong et al. |
| 2019/0146248 A1 | 5/2019 | Wang et al. |
| 2019/0296440 A1 | 9/2019 | Haziza |

FOREIGN PATENT DOCUMENTS

| | | | |
|---|---|---|---|
| CN | 103975483 | A | 8/2014 |
| CN | 105308789 | A | 2/2016 |
| CN | 106684551 | A | 5/2017 |
| CN | 106932933 | A | 7/2017 |
| CN | 206388860 | U | 8/2017 |
| CN | 107706502 | A | 2/2018 |
| WO | 2018044488 | A1 | 3/2018 |

\* cited by examiner

FIG. 13

ANTENNA AND METHOD OF MANUFACTURING THE SAME, DISPLAY PANEL

CROSS-REFERENCE TO RELATED APPLICATION

This application claims priority to Chinese Patent Application No. 201810525570.0, filed on May 28, 2018, titled "AN ANTENNA AND METHOD OF MANUFACTURING THE SAME", which is incorporated herein by reference in its entirety.

TECHNICAL FIELD

The present disclosure relates to the field of antenna manufacturing, and in particular, to an antenna and a method of manufacturing the same, and a display panel.

BACKGROUND

An antenna (such as a patch antenna) on a surface of a glass substrate can be manufactured by sticking a copper foil to the glass substrate. However, if an accuracy of a sticking process is low, an echo phenomenon will occur. In order to simplify the sticking process, it is necessary to make an impedance of a microstrip line of the antenna adjustable after the antenna is sticked to the glass substrate, so that an input impedance of the antenna can still be matched with or be close to a characteristic impedance of a feeder line of a microstrip line when an error occurs in the sticking process, so as to reduce echo loss and thus reduce a standing wave ratio. "Input impedance" refers to a ratio of a voltage to a current at a feeding point of the antenna. Generally, in addition to factors such as structure and electrical dimensions of the antenna itself, the input impedance of the antenna is also related to a surrounding environment, for example, a refractive index of an electromagnetic wave of the surrounding environment.

SUMMARY

In a first aspect, some embodiments of the present disclosure provide an antenna, which includes a first substrate, a second substrate, a first antenna electrode, a second antenna electrode, a microstrip line, a liquid crystal layer, and at least one drive electrode assembly. The first substrate and the second substrate are opposite to each other. The first antenna electrode is disposed on a side of the first substrate away from the second substrate. The second antenna electrode is disposed on a side of the second substrate away from the first substrate. The microstrip line is disposed on a side of the second substrate close to the first substrate. An orthographic projection of the microstrip line on the second substrate and an orthographic projection of the first antenna electrode on the second substrate at least partially overlap with each other. The liquid crystal layer is disposed between the first substrate and the second substrate, and an orthographic projection of the liquid crystal layer on the second substrate does not completely overlap with an orthographic projection of the microstrip line on the second substrate. The at least one drive electrode assembly disposed between the first substrate and the second substrate. The at least one drive electrode assembly is configured to achieve impedance matching of the antenna by controlling liquid crystal molecules of the liquid crystal layer to deflect.

Optionally, an orthographic projection of the liquid crystal layer on the second substrate does not overlap with an orthographic projection of the microstrip line on the second substrate.

Optionally, each of the at least one drive electrode assembly includes a first drive electrode and a second drive electrode.

Optionally, the antenna includes two drive electrode assemblies. An orthographic projection of one of the two drive electrode assemblies on the first substrate is located on a side of an orthographic projection of the microstrip line on the first substrate, and an orthographic projection of another of the two drive electrode assemblies is located on an opposite side of the orthographic projection of the microstrip line on the first substrate.

Optionally, the first drive electrode and the second drive electrode of each of the two drive electrode assemblies are both located on one of opposite surfaces of the first substrate and the second substrate.

Optionally, the first drive electrode and the second drive electrode of each of the two drive electrode assemblies are respectively located on the first substrate and the second substrate, and are disposed opposite to each other.

Optionally, each of the two drive electrode assemblies further includes a third drive electrode and a fourth drive electrode; the first drive electrode and the second drive electrode of each drive electrode assembly are both located on one of the first substrate and the second substrate; the third drive electrode and the fourth drive electrode of each drive electrode assembly are both located on another of the first substrate and the second substrate; the first drive electrode and the third drive electrode of each drive electrode assembly are disposed opposite to each other, and the second drive electrode and the fourth drive electrode of each drive electrode assembly are disposed opposite to each other.

Optionally, the first drive electrode, the second drive electrode, the third drive electrode and the fourth drive electrode are all strip electrodes.

Optionally, the first drive electrode, the second drive electrode, the third drive electrode and the fourth drive electrode are all indium tin oxide thin film electrodes, and a thickness of the indium tin oxide film electrodes is less than 0.1 μm.

Optionally, the liquid crystal layer includes positive liquid crystals.

Optionally, initial alignments of the liquid crystal molecules in the liquid crystal layer include vertical alignment.

Optionally, initial alignments of the liquid crystal molecules in the liquid crystal layer include horizontal alignment, and an initial alignment direction of liquid crystal molecules on one side of a region between the first substrate and the second substrate that is opposite to the microstrip line is opposite to an initial alignment direction of liquid crystal molecules on another side of the same region.

Optionally, the at least one drive electrode assembly is configured to adjust a characteristic impedance of the microstrip line to achieve impedance matching to an input impedance of a feeder line of the antenna by controlling liquid crystal molecules of the liquid crystal layer to deflect.

In a second aspect, some embodiments of the present disclosure provide a display panel, which is provided with the antenna according to the first aspect.

In a third aspect, some embodiments of the present disclosure provide a method of manufacturing an antenna, which includes: forming a first antenna electrode on a side of the first substrate; forming a microstrip line on a side of the second substrate and a second antenna electrode on an opposite side of the second substrate, an orthographic projection of the first antenna electrode on the second substrate and an orthographic projection of the microstrip line on the second substrate at least partially overlapping with each other; forming at least one drive electrode assembly between the first substrate and the second substrate; forming a liquid crystal layer on an opposite side of the first substrate on which the first antenna electrode is not formed, or on a side of the second substrate provided with the microstrip line; and celling the first substrate and the second substrate face to face. The at least one drive electrode assembly is configured to achieve impedance matching of the antenna by controlling liquid crystal molecules of the liquid crystal layer to deflect.

BRIEF DESCRIPTION OF THE DRAWINGS

In order to describe technical solutions in embodiments of the present disclosure more clearly, the accompanying drawings to be used in the description of disclosure will be introduced briefly. Obviously, the accompanying drawings to be described below are merely some embodiments of the present disclosure, and a person of ordinary skill in the art can obtain other drawings according to these drawings without paying any creative effort.

DETAILED DESCRIPTION

The technical solutions in embodiments of the present disclosure will be described clearly and completely below with reference to the accompanying drawings in the embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

It will be noted that, in embodiments of the present disclosure, words like "illustratively" or "for example" are used to indicate an example, an illustration, or a description. Any embodiment or design described as "illustratively" or "for example" in embodiments of the present disclosure should not be construed as preferred or advantageous over other embodiments or designs. Rather, use of the words "illustratively" or "for example" is intended to present relevant concepts in a particular manner.

It will also be noted that, in embodiments of the present disclosure, "of", "corresponding" and "relevant" may sometimes be used as appropriate. It will be noted that meanings expressed by these words are consistent when a distinction is not emphasized.

In order to facilitate description of technical solutions of embodiments of the present disclosure, in embodiments of the present disclosure, words such as "first" and "second" are used to distinguish between same or similar items whose functions and effects are substantially the same. Those skilled in the art will understand that the words such as "first" and "second" are not intended to limit a quantity and order of execution of the items.

Figure 1:
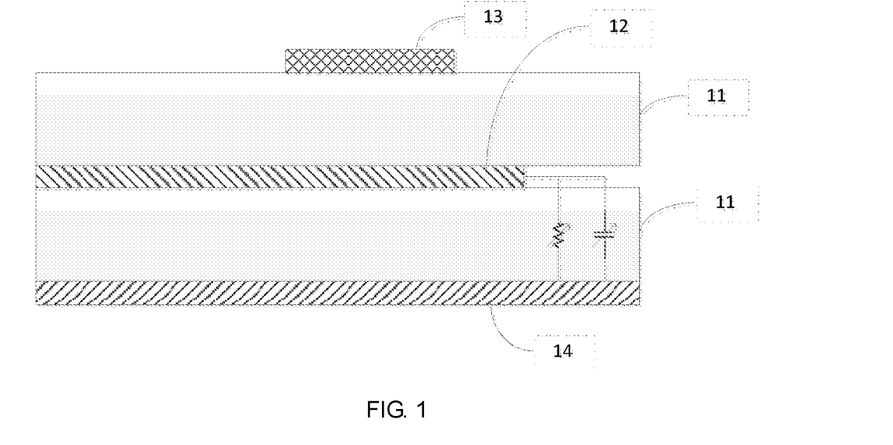
FIG. 1 is a schematic diagram showing a structure of a PCB patch antenna according to the related art.

Referring to FIG. 1, a PCB patch antenna in the related art includes PCBs 11, a microstrip line 12, a patch of antenna 13 and a ground electrode 14. In the PCB patch antenna in the related art, in order to solve the problem of poor sticking accuracy, it is generally necessary to add a variable inductor and a variable capacitor between the microstrip line 12 and the ground electrode 14 of the antenna, so as to adjust a characteristic impedance of the microstrip line 12 and thus reduce a standing wave ratio. However, when manufacturing a glass substrate antenna (i.e., manufacturing an antenna on a surface of a glass substrate), if the above method of sticking is used to manufacture the patch antenna, it will be found that connecting the variable inductor and the variable capacitor to the glass substrate is much more difficult than connecting the variable inductor and the variable capacitor to a conventional printed circuit board (PCB). For example, it is not possible to punch as many holes as possible in a glass substrate like in a PCB, therefore the manufacturing process is more complicated.

Figure 2:
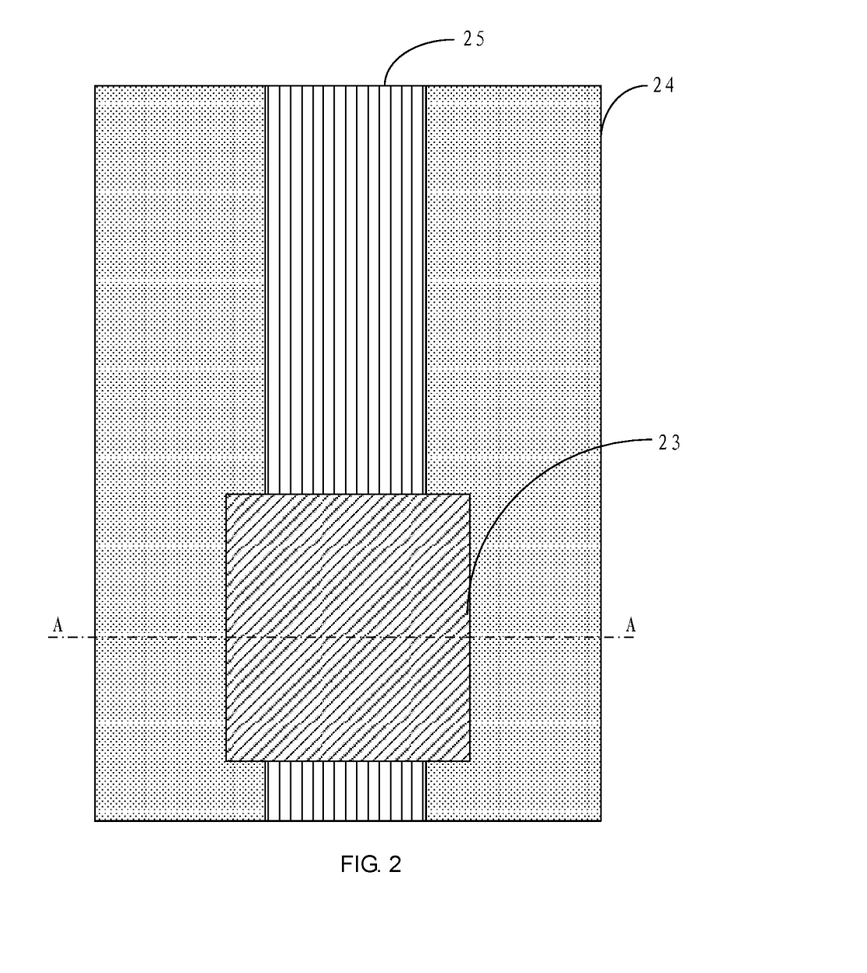
FIG. 2 is a top view of an antenna according to some embodiments of the present disclosure.
Figure 3:
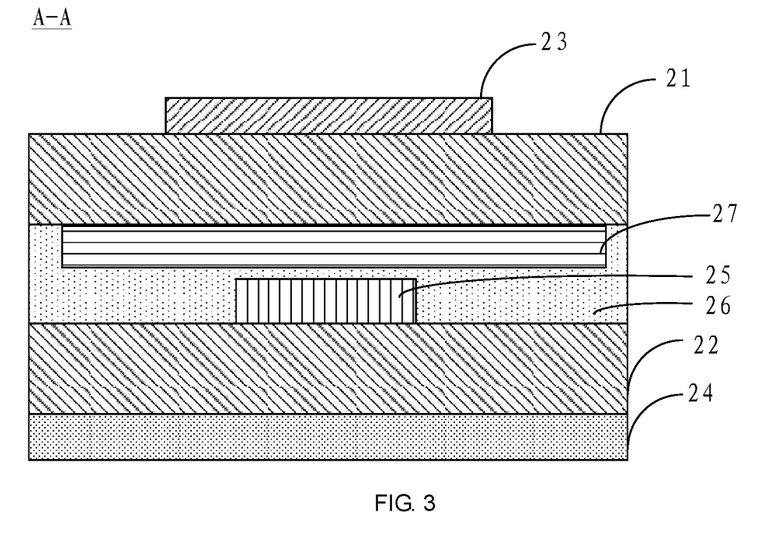
FIG. 3 is a cross-sectional view taken along line A-A in FIG. 2.

Based on the above, referring to FIGS. 2 and 3, some embodiments of the present disclosure provide an antenna, which includes: a first substrate 21, a second substrate 22, a microstrip line 25, a liquid crystal layer 26, at least one drive electrode assembly 27, a first antenna electrode 23, and a second antenna electrode 24.

The first substrate 21 and the second substrate 22 are opposite to each other. The first antenna electrode 23 is disposed on a side of the first substrate 21 away from the second substrate 22. The second antenna electrode 24 is disposed on a side of the second substrate 22 away the first substrate 21. The microstrip line 25 is disposed on a side of the second substrate 22 close to the first substrate 21, and an orthographic projection of the microstrip line 25 on the second substrate 22 and an orthographic projection of the first antenna electrode 23 on the second substrate 22 at least partially overlap with each other. The liquid crystal layer 26 is disposed between the first substrate 21 and the second substrate 22, and an orthographic projection of the liquid crystal layer 26 on the second substrate 22 does not completely overlap with an orthographic projection of the microstrip line 25 on the second substrate 22. The at least one drive electrode assembly 27 is disposed between the first substrate 21 and the second substrate 22, for example, disposed on one of opposite surfaces of the first substrate and the second substrate. The at least one drive electrode assembly 27 is configured to achieve impedance matching of the antenna by controlling liquid crystal molecules of the liquid crystal layer to deflect. For example, the at least one drive electrode assembly 27 is configured to adjust a characteristic impedance of the microstrip line 25 to achieve impedance matching to an input impedance of a feeder line of the antenna. The input impedance is a ratio of an input voltage to an input current of the antenna on the feeder line. For example, the first antenna electrode, the second antenna electrode, and the microstrip line may be disposed as shown in the top view of the antenna in FIG. 2 (the first substrate, the second substrate, the liquid crystal layer and the drive electrode assembly are not shown in FIG. 2).

In the antenna provided in some embodiments of the present disclosure, the at least one drive electrode assembly is used to change a spatial arrangement of liquid crystal molecules in the liquid crystal layer disposed adjacent to the microstrip line, so as to change a refractive index of electromagnetic waves in a fringe electric field of the microstrip line in the antenna and a dielectric constant of the fringe electric field of the microstrip line, and thus a characteristic impedance of the microstrip line is adjusted to match an input impedance of the feeder line of the antenna, and reduce the standing wave ratio of the antenna. Moreover, the antenna provided in some embodiments of the present disclosure may be manufactured using a manufacturing process of a liquid crystal panel (TFT-LCD) (e.g., using a photolithography process and liquid crystals). Therefore, there is no need for additional devices (e.g., a punching device), thereby reducing the cost. In addition, compared to a manufacturing process of a PCB patch antenna in the related art, in some embodiments of the present disclosure, there is no need to punch holes in the antenna. Therefore, a difficulty of manufacturing the antenna is reduced.

The characteristic impedance of the microstrip line may be matched with an input impedance of a feeder line of the antenna by: deflecting liquid crystal molecules which are close to an edge of the microstrip line when applying a voltage of 5V to 50V to the liquid crystal molecules, for example, 5V, 20V, 30V, 35V, 50V; and setting a spacing between the first antenna electrode and the second antenna electrode to 10 to 100 um, for example, 10 μm, 20 μm, 60 μm, 100 μm. In this way, the characteristic impedance of the microstrip line is adjusted by about 10% to be matched with the input impedance of the antenna.

In addition, it is undesirable that liquid crystal molecules in a region between the first substrate and the second substrate that is opposite to the microstrip line are deflected. This is because deflection of liquid crystal molecules in this region greatly affects a phase of the liquid crystal molecules of the entire liquid crystal layer and a radiation efficiency of the antenna.

In some embodiments of the present disclosure, the first substrate and the second substrate are generally glass substrates. Exemplarily, the first antenna electrode is a metal patch, and the second antenna electrode is a ground electrode. In this case, the antenna shown in FIG. 2 may be referred to as a patch antenna. Optionally, referring to FIG. 2, the microstrip line is strip-shaped. In addition, since positive liquid crystals are more responsive to an external electric field than negative liquid crystals, in some embodiments of the present disclosure, positive liquid crystals are adopted in the liquid crystal layer.

Figure 4:
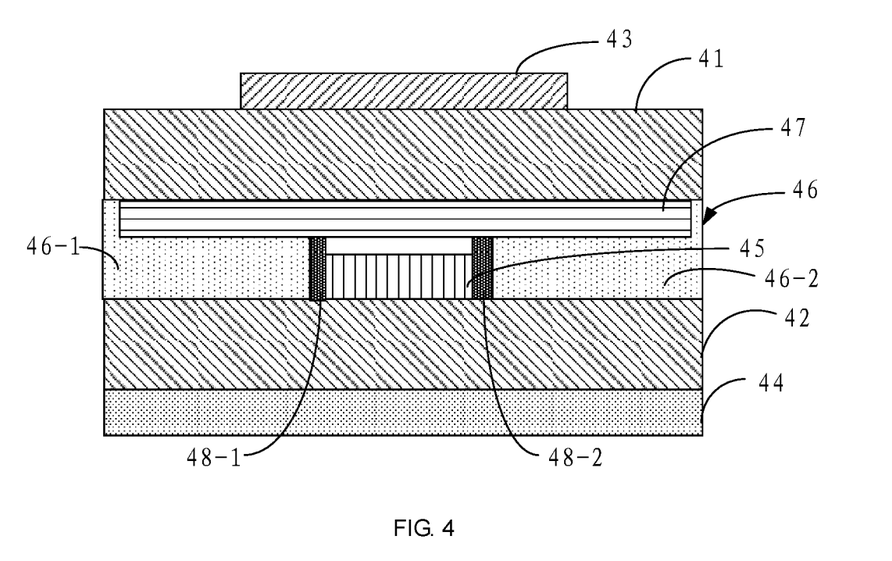
FIG. 4 is a cross-sectional view of another antenna according to some embodiments of the present disclosure.

Referring to FIG. 4, in a process of manufacturing an antenna by using the manufacturing process of a liquid crystal panel, since the liquid crystals in the region between the first substrate 41 and the second substrate 42 that is opposite to the microstrip line 45 neither adjust the impedance of the microstrip line, nor are controlled by the drive electrode assembly 47, and in order not to waste liquid crystals, optionally, an orthographic projection of the liquid crystal layer 46 on the second substrate 42 is made not to overlap with an orthographic projection of the microstrip line 45 on the second substrate 42 in some embodiments of the present disclosure. That is, the liquid crystal layer 46 (46-1 and 46-2) is disposed in a region outside the region between the first substrate 41 and the second substrate 42 that is opposite to the microstrip line. In addition, in order to prevent the liquid crystals from flowing onto the microstrip line 45, encapsulating barrier walls 48 (48-1 and 48-2) are also provided on both sides of the microstrip line 45. In this way, a further manufacturing process of the liquid crystal panel is used, for example, an encapsulation process. Therefore, a manufacturing process of the antenna is more compatible with the manufacturing process of the liquid crystal panel, thereby reducing the cost.

Figure 5:
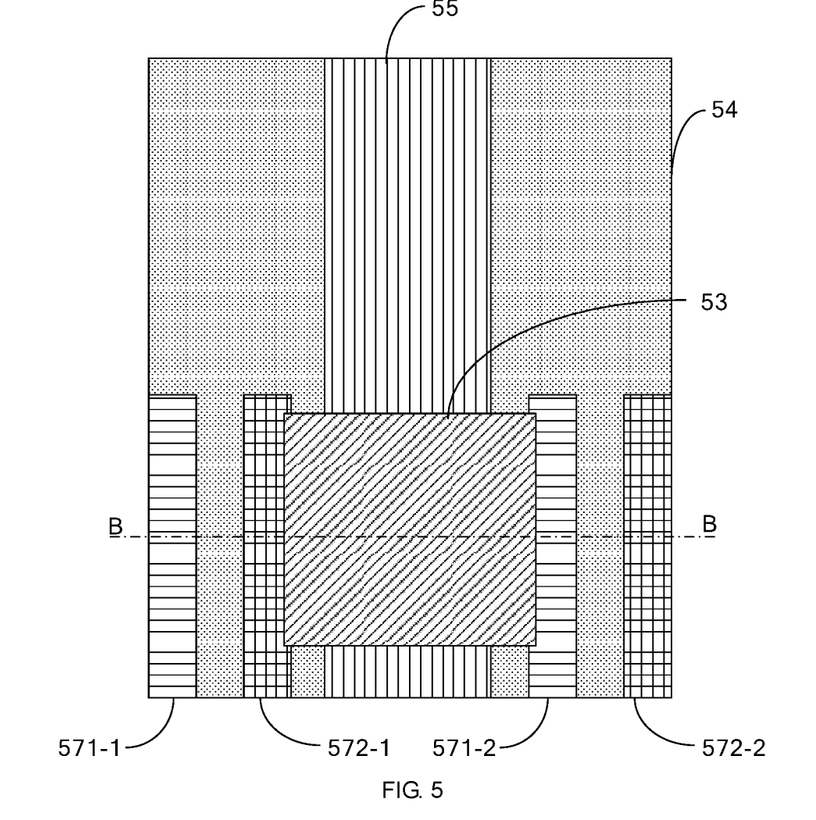
FIG. 5 is a top view of a structure of the antenna shown in FIG. 2 in a case where the antenna includes two drive electrode assemblies according to some embodiments of the present disclosure.
Figure 6:
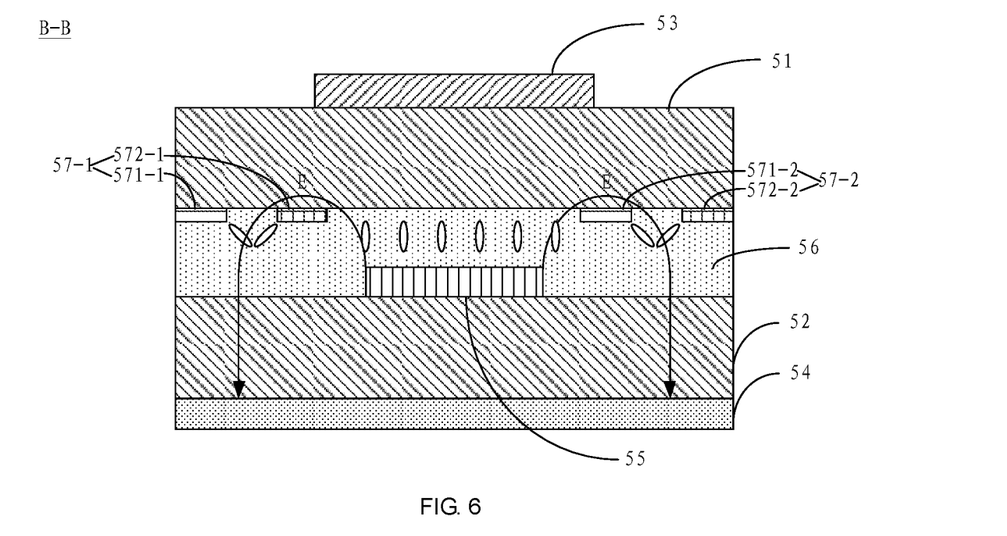
FIG. 6 is a cross-sectional view taken along line B-B in FIG. 5.

Referring to FIGS. 5 and 6, the antenna in some embodiments of the present disclosure includes two drive electrode assemblies 57-1 and 57-2, a first substrate 51, a second substrate 52, a first antenna electrode 53, a second antenna electrode 54, a liquid crystal layer 56, and a microstrip line 55. An orthographic projection of one of the two drive electrode assemblies 57-1 and 57-2 on the first substrate 51 is located on one side of an orthographic projection of the microstrip line 55 on the first substrate 51, and an orthographic projection of another of the two drive electrode assemblies 57-1 and 57-2 on the first substrate 51 is located on an opposite side of an orthographic projection of the microstrip line 55 on the first substrate 51. The drive electrode assembly 57-1 includes a first drive electrode 571-1 and a second drive electrode 572-1, and the first drive electrode 571-1 and the second drive electrode 572-1 are both located on a side of the first substrate 51 close to the second substrate 52. The drive electrode assembly 57-2 includes a first drive electrode 571-2 and a second drive electrode 572-2, and the first drive electrode 571-2 and the second drive electrode 572-2 are both located on the side of the first substrate 51 close to the second substrate 52. In order to facilitate control of the liquid crystals, in some embodiments of the present disclosure, the first drive electrodes 571-1, 571-2 and the second drive electrodes 572-1, 572-2 are arranged side by side.

Still referring to FIGS. 5 and 6, a mark "E" in FIGS. 5 and 6 indicates a fringe electric field of the microstrip line 55. Elliptical marks in FIG. 6 represent liquid crystal molecules, and an initial alignment of liquid crystal molecules in the liquid crystal layer 56 is vertical alignment. It will be noted that the fringe electric field of the microstrip line does not affect a control of the liquid crystal layer on the edge of the microstrip line by the drive electrode assemblies. This is because, compared with a voltage usually required to control the liquid crystal molecules to deflect, a voltage of the fringe electric field of the microstrip line is several orders of magnitude smaller. Therefore, the fringe electric field of the microstrip line will not control the liquid crystal molecules in the liquid crystal layer to deflect or affect deflection of the liquid crystal molecules.

In addition, an orthographic projection of the first antenna electrode 53 on the second substrate 52 and an orthographic projection of the microstrip line 55 on the second substrate 52 at least partially overlap, as shown in the top view of the antenna in FIG. 5 (the first substrate, the second substrate, and the liquid crystal layer are not shown in FIG. 5).

Exemplarily, still referring to FIGS. 5 and 6, the first drive electrodes 571-1, 571-2 and the second drive electrodes 572-1, 572-2 are strip electrodes.

Figure 7:
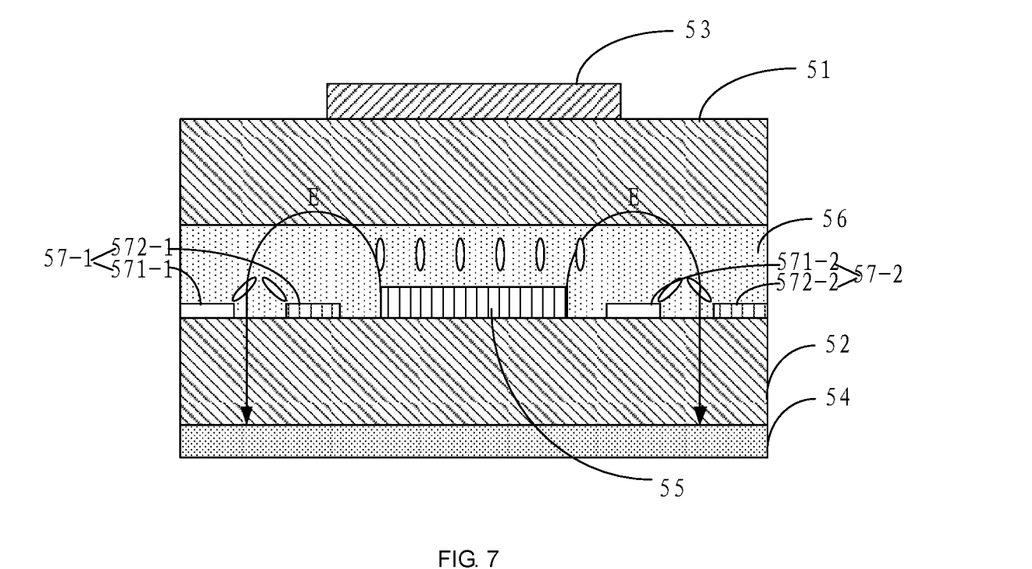
FIG. 7 is a top view of another structure of the antenna shown in FIG. 2 in a case where the antenna includes two drive electrode assemblies according to some embodiments of the present disclosure.

Another arrangement of the two drive electrode assemblies 57-1 and 57-2 is described below. Referring to FIG. 7, on a basis that an orthographic projection of one of the two drive electrode assemblies 57-1 and 57-2 on the first substrate 51 is located on one side of the orthographic projection of the microstrip line 55 on the first substrate 51 and an orthographic projection of another of the two drive electrode assemblies 57-1 and 57-2 on the first substrate 51 is located on an opposite side of the orthographic projection of the microstrip line 55 on the first substrate 51, the two drive electrode assemblies 57-1 (including the first drive electrode 571-1 and the second drive electrode 572-1) and 57-2 (including the first drive electrode 571-2 and the second drive electrode 572-2) are both disposed on the side of the second substrate 52 close to the first substrate 51.

It will be noted that, there may be a plurality of drive electrode assemblies disposed between the first substrate 51 and the second substrate 52, as long as it is ensured that an orthographic projection of at least one of the plurality of drive electrode assemblies on the first substrate is located on one side of the orthographic projection of the microstrip line on the first substrate, and an orthographic projection of at least one of remaining drive electrode assemblies of the plurality of drive electrode assemblies on the first substrate is located on another side of the orthographic projection of the microstrip line on the first substrate. In addition, in order to facilitate manufacture of the antenna and control of the liquid crystals, the plurality of drive electrode assemblies are generally arranged with an equidistant interval between every two adjacent drive electrode assemblies on the first substrate or on the second substrate.

Optionally, since it is necessary to prevent the first drive electrode and the second drive electrode from interfering with operations of the first antenna electrode 53 and the microstrip line 55 (and prevent an electric field between the microstrip line and the ground electrode from interfering with operations of the first antenna electrode 53 and the microstrip line 55), a sheet resistance of the first drive electrode and the second drive electrode need to be very large, and the first drive electrode and the second drive electrode need to be very thin. Therefore, in some embodiments of the present disclosure, the first drive electrodes 571-1, 571-2 and the second drive electrodes 572-1, 572-2 are indium tin oxide (ITO) thin film electrodes, and a thickness of the ITO film electrodes is less than 0.1 µm. In addition, in order to prevent the first drive electrode and the second drive electrode from interfering with the operations of the first antenna electrode 53 and the microstrip line 55, positions of the first drive electrode and the second drive electrode (in a case where the first drive electrode and the second drive electrode are disposed on both sides of the microstrip line respectively or on both sides of the orthographic projection of the microstrip line on the first substrate respectively) need to be determined in advance according to simulation results.

It will be noted that, an orthographic projection of the liquid crystal layer 56 on the second substrate 52 may not overlap with the orthographic projection of the microstrip line 55 on the second substrate 52. That is, the liquid crystal layer 56 may be disposed in a region outside the region between the first substrate 51 and the second substrate 52 that is opposite to the microstrip line 55.

Figure 8:
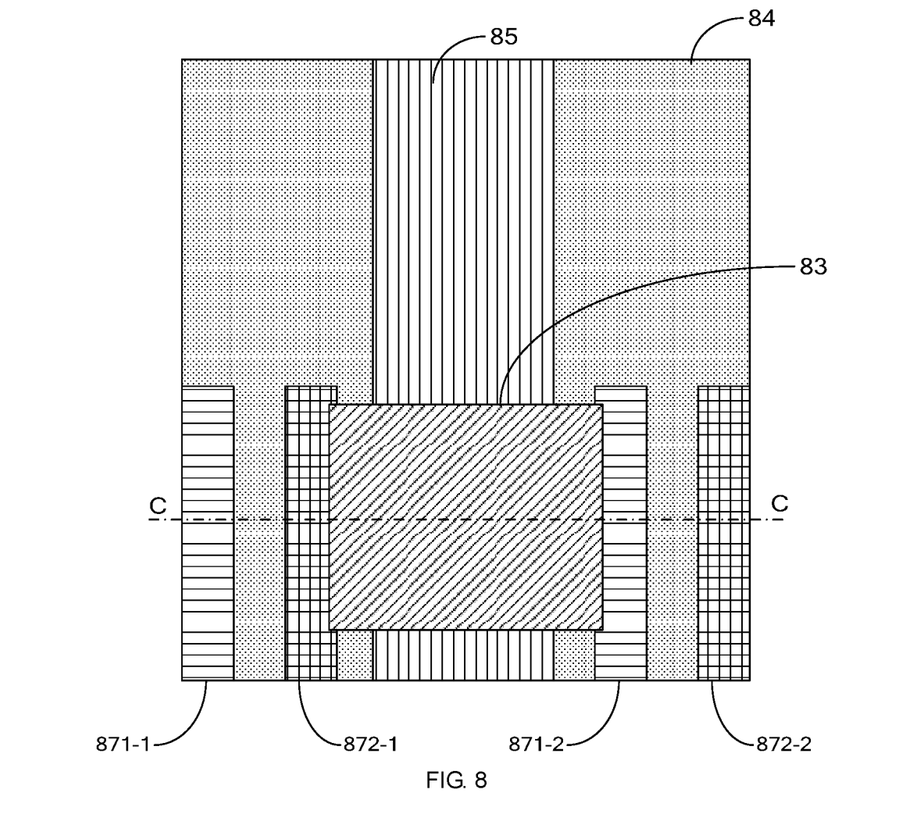
FIG. 8 is a top view of yet another structure of the antenna shown in FIG. 2 in a case where the antenna includes two drive electrode assemblies according to some embodiments of the present disclosure.
Figure 9:
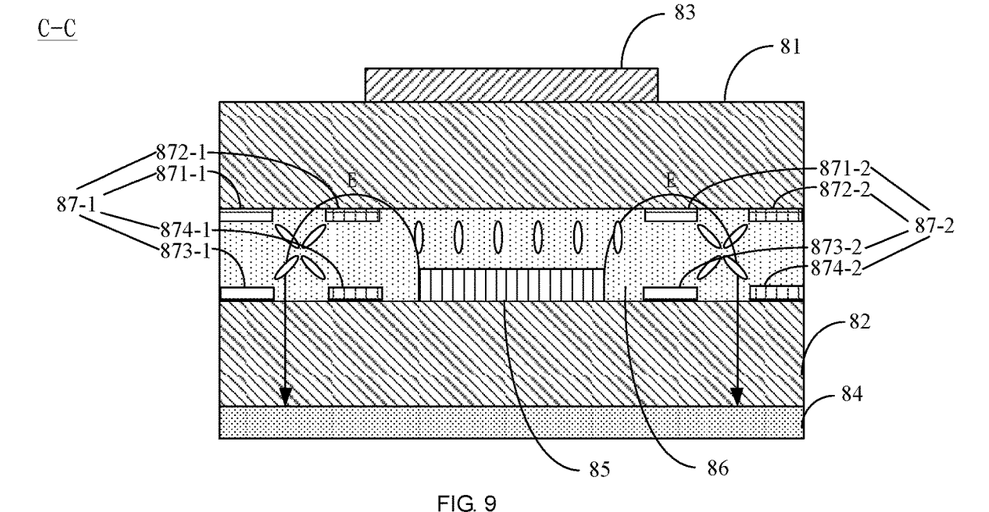
FIG. 9 is a cross-sectional view taken along line C-C in FIG. 8.

Referring to FIGS. 8 and 9, each drive electrode assembly of the antenna provided in some embodiments of the present disclosure includes four drive electrodes, and the antenna includes a first substrate 81, a second substrate 82, a first antenna electrode 83, a second antenna electrode 84, a microstrip line 85 and a liquid crystal layer 86. A mark "E" in FIG. 9 indicates the fringe electric field of the microstrip line. Elliptical marks in FIG. 8 indicate liquid crystal molecules, and the initial alignment of the liquid crystal layer 86 is vertical alignment.

An orthographic projection of the first antenna electrode 83 on the second substrate 82 and an orthographic projection of the microstrip line 85 on the second substrate 82 at least partially overlap, as shown in the top view of the antenna in FIG. 8 (the first substrate, the second substrate, and the liquid crystal layer are not shown in FIG. 8).

Still referring to FIGS. 8 and 9, opposite surfaces of the first substrate 81 and the second substrate 82 are provided with two drive electrode assemblies 87-1 and 87-2, and an orthographic projection of one of the two drive electrode assemblies 87-1 and 87-2 on the first substrate is located on one side of the orthographic projection of the microstrip line 85 on the first substrate 81, and an orthographic projection of another of the two drive electrode assemblies 87-1 and 87-2 on the first substrate is located on an opposite side of the orthographic projection of the microstrip line 85 on the first substrate 81. The drive electrode assembly 87-1 includes a first drive electrode 871-1, a second drive electrode 872-1, a third drive electrode 873-1, and a fourth drive electrode 874-1. The drive electrode assembly 87-2 includes a first drive electrode 871-2, a second drive electrode 872-2, a third drive electrode 873-2, and a fourth drive electrode 874-2. The first drive electrode and the third drive electrode of each of the drive electrode assemblies 87-1, 87-2 are disposed opposite to each other, and the second drive electrode and the fourth drive electrode of each of the drive electrode assemblies 87-1, 87-2 are disposed opposite to each other. Of course, on a basis of not affecting the control of the liquid crystals, the first drive electrode and the third drive electrode in each drive electrode assembly may not be disposed opposite to each other, and the second drive electrode and the fourth drive electrode in each drive electrode assembly also may not be disposed opposite to each other.

In addition, it needs to be ensured that the first drive electrode and the second drive electrode of each drive electrode assembly are disposed on one of the first substrate and the second substrate, and the third drive electrode and the fourth drive electrode of each drive electrode assembly are disposed on another of the first substrate and the second substrate. Exemplarily, referring to FIG. 9, the first drive electrode assembly 871-1 and the second drive electrode 872-1 of the drive electrode assembly 87-1 and the first drive electrode assembly 871-2 and the second drive electrode 872-2 of the drive electrode assembly 87-2 are all disposed on the first substrate 81, that is, on a side of the first substrate 81 close to the second substrate 82; the third drive electrode assembly 873-1 and the fourth drive electrode 874-1 of the drive electrode assembly 87-1 and the third drive electrode assembly 873-2 and the fourth drive electrode 874-2 of the drive electrode assembly 87-2 are all disposed on the second substrate 82, that is, on a side of the second substrate 82 close to the first substrate 81. Positions of the first drive electrode and the third drive electrode of each drive electrode assembly may be interchanged, in which case positions of the second drive electrode and the fourth drive electrode also need to be interchanged.

It will be noted that, there may be a plurality of drive electrode assemblies disposed between the first substrate 81 and the second substrate 82, as long as it is ensured that an orthographic projection of at least one of the plurality of drive electrode assemblies on the first substrate is located on one side of the orthographic projection of the microstrip line on the first substrate, and an orthographic projection of at least one of remaining drive electrode assemblies of the plurality of drive electrode assemblies on the first substrate is located on another side of the orthographic projection of the microstrip line on the first substrate. In addition, since it is necessary to ensure that there is no voltage difference between the oppositely disposed drive electrodes in some embodiments, so that the liquid crystals between the oppositely disposed drive electrodes are not controlled to deflect, it is arranged in a way that there is no voltage difference between the first drive electrode and the third drive electrode disposed oppositely, and between the second drive electrode and the fourth drive electrode disposed oppositely, of each drive electrode assembly. Polarities of the first, second, third, and fourth drive electrodes are not limited, as long as a direction and size of an electric field between the first drive electrode and the second drive electrode are the same as a direction and size of an electric field between the third drive electrode and the fourth drive electrode.

Exemplarily, referring to FIGS. 8 and 9, the first drive electrodes 871-1 and 871-2, the second drive electrodes 872-1 and 872-2, the third drive electrodes 873-1 and 873-2, and the fourth drive electrodes 874-1 and 874-2 are all strip electrodes. In the drive electrode assembly 87-1, the first drive electrode 871-1 is parallel to the second drive electrode 872-1, and the third drive electrode 873-1 is parallel to the fourth drive electrode 874-1. Similarly, in the drive electrode assembly 87-2, the four drive electrodes are disposed in a same way (of parallel arrangement) as in the drive electrode assembly 87-1.

In addition, since it is necessary to prevent the drive electrodes from interfering with operations of the first antenna electrode 83 and the microstrip line 85 (and prevent an electric field between the microstrip line 85 and the second antenna electrode 84 from interfering with operations of the first antenna electrode 83 and the microstrip line 85), a sheet resistance of the drive electrodes need to be very large, and the drive electrodes need to be very thin. Therefore, in some embodiments of the present disclosure, the first drive electrode, the second drive electrode, the third drive electrode, and the fourth drive electrode are all ITO thin film electrodes, and a thickness of the ITO film electrodes is less than 0.1 µm. In addition, in order to prevent the drive electrodes from interfering with the operations of the first antenna electrode 83 and the microstrip line 85, positions of the drive electrodes (in a case where the drive electrodes are disposed on both sides of the microstrip line respectively or on both sides of the orthographic projection of the microstrip line on the first substrate respectively) need to be determined in advance according to simulation results.

It will be noted that, an orthographic projection of the liquid crystal layer 86 on the second substrate 82 may not overlap with an orthographic projection of the microstrip line 85 on the second substrate 82. That is, the liquid crystal layer 86 may be disposed in a region outside the region between the first substrate 81 and the second substrate 82 that is opposite to the microstrip line 85.

The antenna in some embodiments of the present disclosure uses four drive electrodes (the first drive electrode, the second drive electrode, the third drive electrode, and the fourth drive electrode) of each drive electrode assembly to change a spatial arrangement of the liquid crystal molecules in the liquid crystal layer, so as to better control the liquid crystal layer and thus better match the characteristic impedance of the microstrip line to the input impedance of the antenna.

Figure 10:
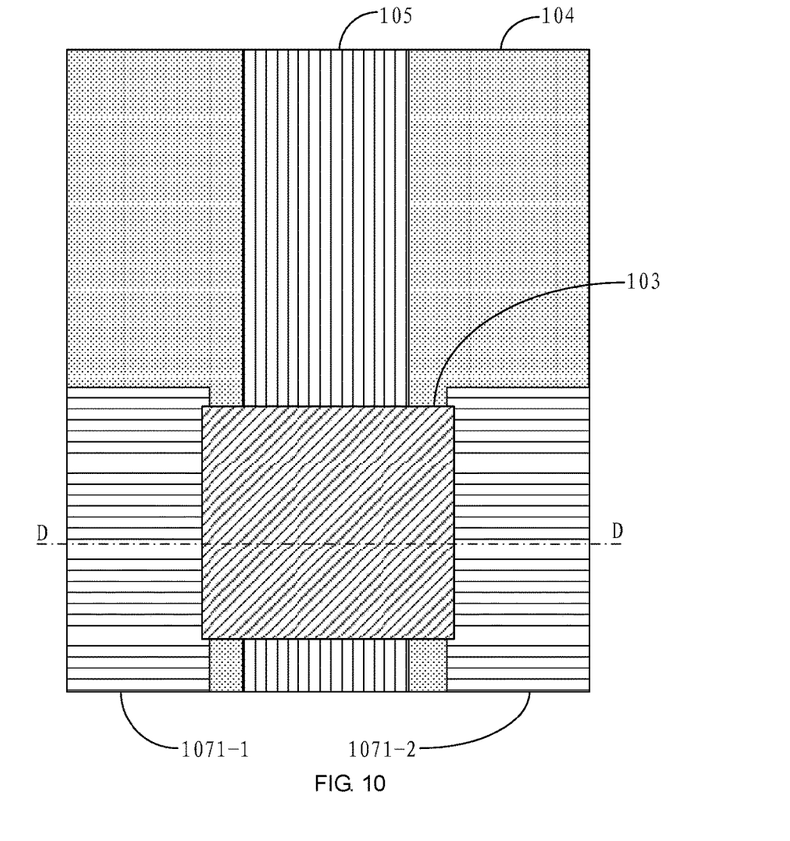
FIG. 10 is a top view of yet another structure of the antenna shown in FIG. 2 in a case where the antenna includes two drive electrode assemblies according to some embodiments of the present disclosure.

Referring to FIG. 10, the antenna provided in some embodiments of the present disclosure includes two drive electrode assemblies, and the antenna includes a first substrate 101, a second substrate 102, a first antenna electrode 103, a second antenna electrode 104, a microstrip line 105, and liquid crystal layer 106.

A mark "E" in FIG. 10 indicates the fringe electric field of the microstrip line. Elliptical marks in FIG. 11 indicate liquid crystal molecules, and the initial alignment of the liquid crystal layer is horizontal alignment.

The orthographic projection of the first antenna electrode 103 on the second substrate 102 and the orthographic projection of the microstrip line 105 on the second substrate 102 at least partially overlap, as shown in the top view of the antenna in FIG. 10 (the first substrate, the second substrate, and the liquid crystal layer are not shown in FIG. 10).

Opposite surfaces of the first substrate 101 and the second substrate 102 are provided with two drive electrode assemblies 107-1 and 107-2. In some embodiments of the present disclosure, an orthographic projection of one of the two drive electrode assemblies 107-1 and 107-2 on the first substrate 103 is located on one side of the orthographic projection of the microstrip line 105 on the first substrate 101, and an orthographic projection of another of the two drive electrode assemblies 107-1 and 107-2 on the first substrate 103 is located on an opposite side of the orthographic projection of the microstrip line 105 on the first substrate 101. The drive electrode assembly 107-1 includes a first drive electrode 1071-1 and a second drive electrode 1072-1, and the drive electrode assembly 107-2 includes a first drive electrode 1071-2 and a second drive electrode 1072-2.

Figure 11:
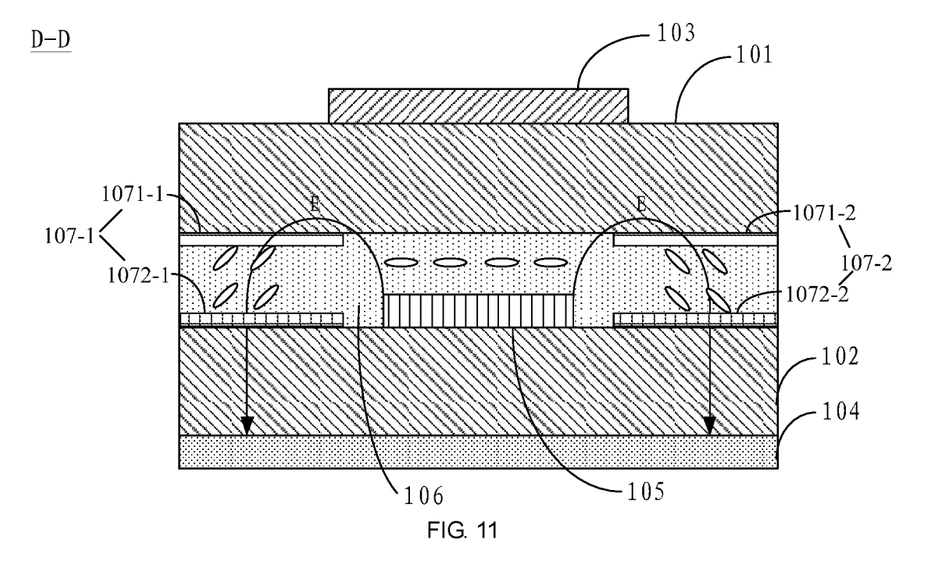
FIG. 11 is a cross-sectional view taken along line D-D in FIG. 10.

In addition, in some embodiments of the present disclosure, it needs to be ensured that the first drive electrode of each drive electrode assembly is located on one of the first substrate and the second substrate, and the second drive electrode of each drive electrode assembly is located on another of the first substrate and the second substrate. The first drive electrode and the second drive electrode are disposed opposite to each other, as shown in FIG. 11. The first drive electrode 1071-1 of the drive electrode assembly 107-1 and the first drive electrode 1071-2 of the drive electrode assembly 107-2 are both disposed on the first substrate 101, that is, on a side of the first substrate 101 close to the second substrate 102. A position opposite to the first drive electrode 1071-1 on the second substrate is provided with the second drive electrode 1072-1 of the drive electrode assembly 107-1, and a position opposite to the first drive electrode 1071-2 on the second substrate is provided with the second drive electrode 1072-2 of the drive electrode assembly 107-2. Positions of the first drive electrode and the second drive electrode of each drive electrode assembly may be interchanged.

Exemplarily, referring to FIGS. 10 and 11, the first drive electrodes 1071-1, 1071-2 and the second drive electrodes 1072-1, 1072-2 are strip electrodes, and are facing each other in parallel (in FIG. 10, the second drive electrodes in the drive electrode assemblies 107-1, 107-2 are located directly below the first drive electrodes of the drive electrode assemblies 107-1, 107-2, and are thus not visible in the drawing).

In addition, in order to ensure that refractive indexes of electromagnetic waves in the fringe electric fields on left and right sides of the region between the first substrate 101 and the second substrate 102 that is opposite to the microstrip line 105 are the same, in some embodiments of the present disclosure, initial alignments of the liquid crystal molecules on both sides of the microstrip line are horizontal alignment. And under a control of a voltage, alignment directions of the liquid crystal molecules on both sides of the microstrip line are opposite. For example, the initial alignment of the liquid crystal molecules may be accomplished by various methods of photoalignment.

Optionally, since it is necessary to prevent the drive electrodes from interfering with operations of the first antenna electrode 103 and the microstrip line 105 (and prevent an electric field between the microstrip line 105 and the second antenna electrode 104 from interfering with operations of the first antenna electrode 103 and the microstrip line 105), a sheet resistance of the drive electrodes need to be very large, and the drive electrodes need to be very thin. Therefore, in some embodiments of the present disclosure, the first drive electrode and the second drive electrode are both ITO thin film electrodes, and a thickness of the ITO film electrodes is less than 0.1 µm. In addition, in order to prevent the drive electrodes from interfering with the operations of the first antenna electrode 103 and the microstrip line 105, positions of the drive electrodes (in a case where the drive electrodes are disposed on both sides of an orthographic projection of the microstrip line on the first substrate) need to be determined in advance according to simulation results.

It will be noted that, in some embodiments of the present disclosure, the antenna may include a plurality of drive electrode assemblies, as long as it is ensured that an orthographic projection of at least one of the plurality of drive electrode assemblies on the first substrate 101 is located on one side of the orthographic projection of the microstrip line 105 on the first substrate 101, and an orthographic projection of at least one of remaining drive electrode assemblies of the plurality of drive electrode assemblies on the first substrate 101 is located on another side of the orthographic projection of the microstrip line 105 on the first substrate 101. In addition, there is no overlapping region between the orthographic projection of the liquid crystal layer 106 on the second substrate 102 and the orthographic projection of the microstrip line 105 on the second substrate 102. That is, the liquid crystal layer 106 may be disposed in a region outside the region between the first substrate 101 and the second substrate 102 that is opposite to the microstrip line 105.

Figure 13:
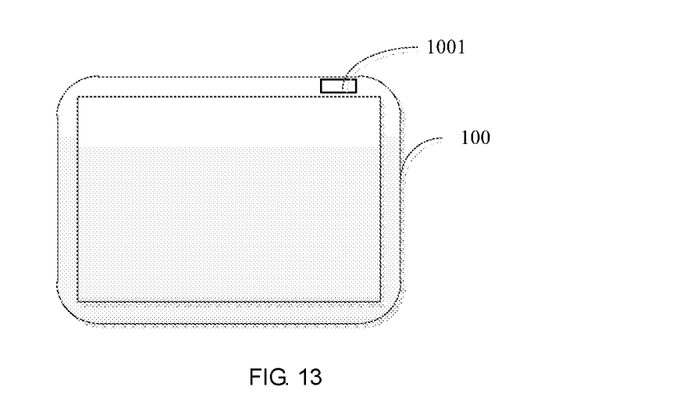
FIG. 13 is a schematic diagram showing a structure of a display panel provided with an antenna according to some embodiments of the present disclosure.

As shown in FIG. 13, some embodiments of the present disclosure further provide a display panel 100, which is provided with an antenna 1001 as described above.

Figure 12:
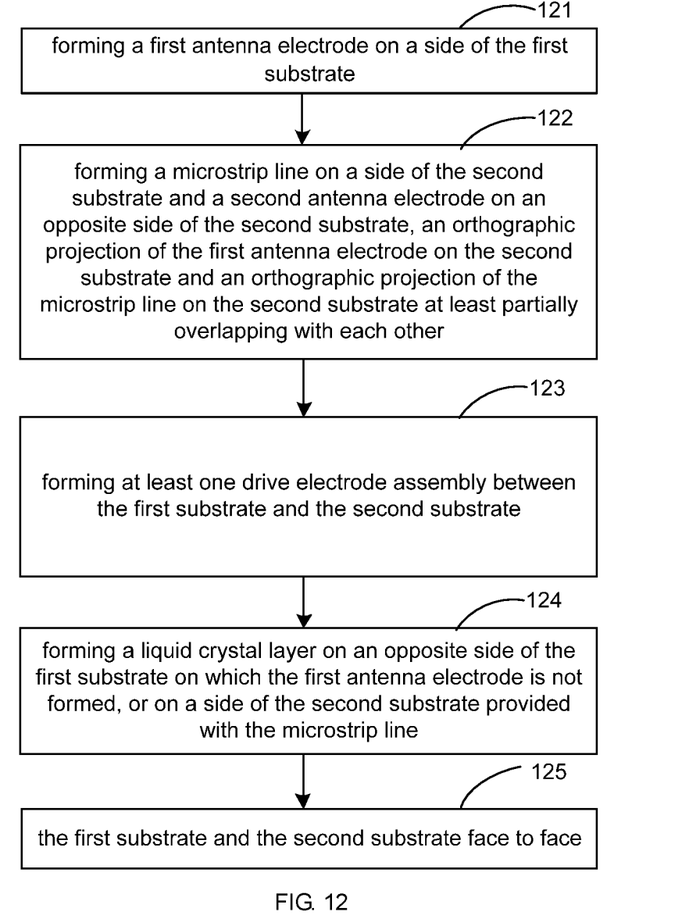
FIG. 12 is a flow chart of a method of manufacturing an antenna according to some embodiments of the present disclosure.

Referring to FIG. 12, some embodiments of the present disclosure further provide a method of manufacturing an antenna, which includes steps 121~125 (S121~S125).

S121, forming a first antenna electrode on a side of the first substrate;

S122, forming a microstrip line on one side of the second substrate and a second antenna electrode on an opposite side of the second substrate, an orthographic projection of the first antenna electrode on the second substrate and an orthographic projection of the microstrip line on the second substrate at least partially overlapping with each other;

S123, forming at least one drive electrode assembly between the first substrate and the second substrate, the at least one drive electrode assembly being configured to achieve impedance matching of the antenna by controlling liquid crystal molecules of the liquid crystal layer to deflect;

S124, forming a liquid crystal layer on an opposite side of the first substrate on which the first antenna electrode is not formed, or on a side of the second substrate provided with the microstrip line; and S125, celling the first substrate and the second substrate face to face.

Exemplarily, the first antenna electrode is a metal patch in the patch antenna, and the second antenna electrode is a ground electrode.

The foregoing descriptions are merely some implementation manners of the present disclosure, but the protection scope of the present disclosure is not limited thereto. Any person skilled in the art could readily conceive of changes or replacements within the technical scope of the present disclosure, which shall all be included in the protection scope of the present disclosure. Therefore, the protection scope of the present disclosure shall be subjected to the protection scope of the claims.

What is claimed is:

1. An antenna, comprising:
   a first substrate and a second substrate that are opposite to each other;
   a first antenna electrode disposed on a side of the first substrate away from the second substrate;
   a second antenna electrode disposed on a side of the second substrate away from the first substrate;
   a microstrip line disposed on a side of the second substrate close to the first substrate, an orthographic projection of the microstrip line on the second substrate and an orthographic projection of the first antenna electrode on the second substrate at least partially overlapping with each other;
   a liquid crystal layer disposed between the first substrate and the second substrate, and an orthographic projection of the liquid crystal layer on the second substrate does not completely overlap with an orthographic projection of the microstrip line on the second substrate; and
   at least one drive electrode assembly disposed between the first substrate and the second substrate, wherein the at least one drive electrode assembly is configured to achieve impedance matching of the antenna by controlling liquid crystal molecules of the liquid crystal layer to deflect.

2. The antenna according to claim 1, wherein an orthographic projection of the liquid crystal layer on the second substrate does not overlap with an orthographic projection of the microstrip line on the second substrate.

3. The antenna according to claim 1, wherein each of the at least one drive electrode assembly includes a first drive electrode and a second drive electrode.

4. The antenna according to claim 3, wherein the antenna comprises two drive electrode assemblies; an orthographic projection of one of the two drive electrode assemblies on the first substrate is located on a side of an orthographic projection of the microstrip line on the first substrate, and an orthographic projection of another of the two drive electrode assemblies is located on an opposite side of the orthographic projection of the microstrip line on the first substrate.

5. The antenna according to claim 4, wherein the first drive electrode and the second drive electrode of each of the two drive electrode assemblies are both located on one of opposite surfaces of the first substrate and the second substrate.

6. The antenna according to claim 4, wherein the first drive electrode and the second drive electrode of each of the two drive electrode assemblies are respectively located on the first substrate and the second substrate, and are disposed opposite to each other.

7. The antenna according to claim 4, wherein each of the two drive electrode assemblies further includes a third drive electrode and a fourth drive electrode;
the first drive electrode and the second drive electrode of each drive electrode assembly are both located on one of the first substrate and the second substrate; the third drive electrode and the fourth drive electrode of each drive electrode assembly are both located on an other of the first substrate and the second substrate;
the first drive electrode and the third drive electrode of each drive electrode assembly are disposed opposite to each other, and the second drive electrode and the fourth drive electrode of each drive electrode assembly are disposed opposite to each other.

8. The antenna according to claim 7, wherein the first drive electrode, the second drive electrode, the third drive electrode and the fourth drive electrode are all strip electrodes.

9. The antenna according to claim 7, wherein the first drive electrode, the second drive electrode, the third drive electrode and the fourth drive electrode are all indium tin oxide thin film electrodes, and a thickness of the indium tin oxide film electrodes is less than 0.1 µm.

10. The antenna according to claim 1, wherein the liquid crystal layer includes positive liquid crystals.

11. The antenna according to claim 5, wherein initial alignments of the liquid crystal molecules in the liquid crystal layer include vertical alignment.

12. The antenna according to claim 6, wherein initial alignments of the liquid crystal molecules in the liquid crystal layer include horizontal alignment, and an initial alignment direction of liquid crystal molecules on one side of a region between the first substrate and the second substrate that is opposite to the microstrip line is opposite to an initial alignment direction of liquid crystal molecules on another side of the same region.

13. The antenna according to claim 7, wherein initial alignments of the liquid crystal molecules in the liquid crystal layer include vertical alignment.

14. The antenna according to claim 1, wherein the at least one drive electrode assembly is configured to adjust a characteristic impedance of the microstrip line to achieve impedance matching to an input impedance of a feeder line of the antenna by controlling liquid crystal molecules of the liquid crystal layer to deflect.

15. A display panel provided with the antenna according to claim 1.

16. A method of manufacturing an antenna, comprising:
forming a first antenna electrode on a side of a first substrate;
forming a microstrip line on a side of a second substrate and a second antenna electrode on an opposite side of the second substrate, an orthographic projection of the first antenna electrode on the second substrate and an orthographic projection of the microstrip line on the second substrate at least partially overlapping with each other;
forming at least one drive electrode assembly between the first substrate and the second substrate;
forming a liquid crystal layer on an opposite side of the first substrate on which the first antenna electrode is not formed, or on a side of the second substrate provided with the microstrip line; and
celling the first substrate and the second substrate face to face; wherein
the at least one drive electrode assembly is configured to achieve impedance matching of the antenna by controlling liquid crystal molecules of the liquid crystal layer to deflect.

17. The method of manufacturing an antenna according to claim 16, wherein the at least one drive electrode assembly is configured to adjust an characteristic impedance of the microstrip line to achieve impedance matching to an input impedance of a feeder line of the antenna by controlling liquid crystal molecules of the liquid crystal layer to deflect.

* * * * *